United States Patent
Meng et al.

(10) Patent No.: US 8,275,129 B2
(45) Date of Patent: Sep. 25, 2012

(54) DATA SCRAMBLING, DESCRAMBLING, AND DATA PROCESSING METHOD, AND CONTROLLER AND STORAGE SYSTEM USING THE SAME

(75) Inventors: Tzu-Yuan Meng, Hsinchu County (TW); Ching-Wen Chang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 325 days.

(21) Appl. No.: 12/565,152

(22) Filed: Sep. 23, 2009

(65) Prior Publication Data

US 2011/0035602 A1    Feb. 10, 2011

(30) Foreign Application Priority Data

Aug. 6, 2009 (TW) ................................ 98126528 A

(51) Int. Cl.
*H04L 9/00* (2006.01)
(52) U.S. Cl. ........................................... 380/44; 380/46
(58) Field of Classification Search .................. 380/200, 380/210, 44, 46, 28–30; 713/189, 192–194; 726/30, 26–27; 708/250, 254–255
See application file for complete search history.

(56) References Cited

U.S. PATENT DOCUMENTS

| | | | | |
|---|---|---|---|---|
| 5,892,899 A | * | 4/1999 | Aucsmith et al. | 726/27 |
| 7,073,073 B1 | * | 7/2006 | Nonaka et al. | 713/193 |
| 7,127,612 B1 | * | 10/2006 | Ishibashi | 713/169 |

FOREIGN PATENT DOCUMENTS

| | | |
|---|---|---|
| CN | 101118586 A | 2/2008 |
| CN | 101419652 A | 4/2009 |

OTHER PUBLICATIONS

"First Office Action of China Counterpart Application", issued on May 16, 2012, p. 1-p. 6, in which the listed references were cited.

* cited by examiner

*Primary Examiner* — Hosuk Song
(74) *Attorney, Agent, or Firm* — J.C. Patents

(57) ABSTRACT

A data scrambling method for scrambling raw data from a host system is provided. The data scrambling method includes generating a random number and storing the random number into a storage unit. The data scrambling method also includes receiving a user password from the host system, generating a padded value by using a first function unit based on the random number and the user password, and generating a nonce value by using a second function unit based on the padded value and a key. The data scrambling method further includes generating scrambled data corresponding to the raw data by using a third function unit based on the nonce value and the raw data. Accordingly, the raw data of the host system can be effectively protected.

34 Claims, 5 Drawing Sheets

DATA SCRAMBLING, DESCRAMBLING, AND DATA PROCESSING METHOD, AND CONTROLLER AND STORAGE SYSTEM USING THE SAME

CROSS-REFERENCE TO RELATED APPLICATION

This application claims the priority benefit of Taiwan application serial no. 98126528, filed on Aug. 6, 2009. The entirety of the above-mentioned patent application is hereby incorporated by reference herein and made a part of this specification.

BACKGROUND

1. Technology Field

The present invention relates to a data scrambling and descrambling method, and a storage medium control circuit and a storage system using the same.

2. Description of Related Art

Smart cards have been broadly applied in our daily life along with the increasing consumer acceptance of e-wallet and prepayment. A smart card is an integrated circuit (IC) chip having various components (for example, a microprocessor, a card operating system, a security module, and a memory), and allows a card holder to execute some predetermined operations. A smart card provides calculation, encryption, bidirectional communication, and security functions such that data stored in this card can be protected. Even though an encoder is configured in a smart card for encrypting data, a decoder different from the encoder is further required when the data is to be restored. Since both the encoder and the decoder have very complicated circuits and take up large surface areas, it is difficult to reduce the volume of the entire system. Thereby, how to minimize the volume of a smart card system while still ensuring the security of data stored therein is one of today's major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data scrambling and descrambling method that can effectively protect stored data.

The present invention is directed to a storage medium control circuit that can effectively protect data stored in a storage unit.

The present invention is directed to a storage system that can effectively protect data stored therein.

The present invention is directed to a data processing method that can effectively protect stored data.

According to an exemplary embodiment of the present invention, a data scrambling method for scrambling raw data from a host system is provided. The data scrambling method includes providing a storage medium controller, generating a random number, and storing the random number into a storage unit. The data scrambling method also includes receiving a user password from the host system, generating a padded value by using a first function unit based on the random number and the user password, and generating a nonce value by using a second function unit based on the padded value and a key. The data scrambling method further includes generating scrambled data corresponding to the raw data by using a third function unit based on the nonce value and the raw data by the storage medium controller.

According to an exemplary embodiment of the present invention, a storage medium control circuit for scrambling raw data from a host system is provided. The storage medium control circuit includes a microprocessor unit, a storage medium interface unit, a host interface unit, and a data encoding unit. The storage medium interface unit is coupled to the microprocessor unit and configured to connect to a storage unit. The host interface unit is coupled to the microprocessor unit and configured to connect to the host system. The data encoding unit is coupled to the microprocessor unit, and which generates a padded value by using a first function unit based one a random number and a user password from the host system, generates a nonce value by using a second function unit based on the padded value and a key, and generates scrambled data corresponding to the raw data by using a third function unit based on the nonce value and the raw data, wherein the data encoding unit stores the random number in the storage unit.

According to an exemplary embodiment of the present invention, a storage system including a connector, a storage unit, and a storage medium controller is provided. The connector is configured to couple to a host system and receiving raw data and a user password from the host system. The storage medium controller is coupled to the connector and the storage unit, and which generates a random number, generates a padded value by using a first function unit based on the random number and the user password, generates a nonce value by using a second function unit based on the padded value and a key, generates scrambled data corresponding to the raw data by using a third function unit based on the nonce value and the raw data, and writes the scrambled data into the storage unit, wherein the storage medium controller stores the random number into the storage unit.

According to an exemplary embodiment of the present invention, a data descrambling method for descrambling scrambled data stored in a storage unit based on a user password from a host system is provided. The data descrambling method includes reading a random number from the storage unit and generating a padded value by using a first function unit based on the random number and the user password. The data descrambling method also includes generating a nonce value by using a second function unit based on the padded value and a key and generating raw data corresponding to the scrambled data through the storage medium controller by using a third function unit based on the nonce value and the scrambled data.

According to an exemplary embodiment of the present invention, a data processing method is provided. The data processing method includes providing a storage medium controller and respectively receiving a first key and a second key. The data processing method also includes encrypting the second key by using the first key through the storage medium controller to generate a nonce value, receiving raw data from a host system, and generating scrambled data corresponding to the raw data through the storage medium controller by using a third function unit based on the nonce value and the raw data.

As described above, according to exemplary embodiments of the present invention, a nonce value for scrambling a data is generated based on a user password and a random number every time when a data scrambling process is performed, so that the nonce value for scrambling the data is prevented from being cracked and the security of the data is ensured.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
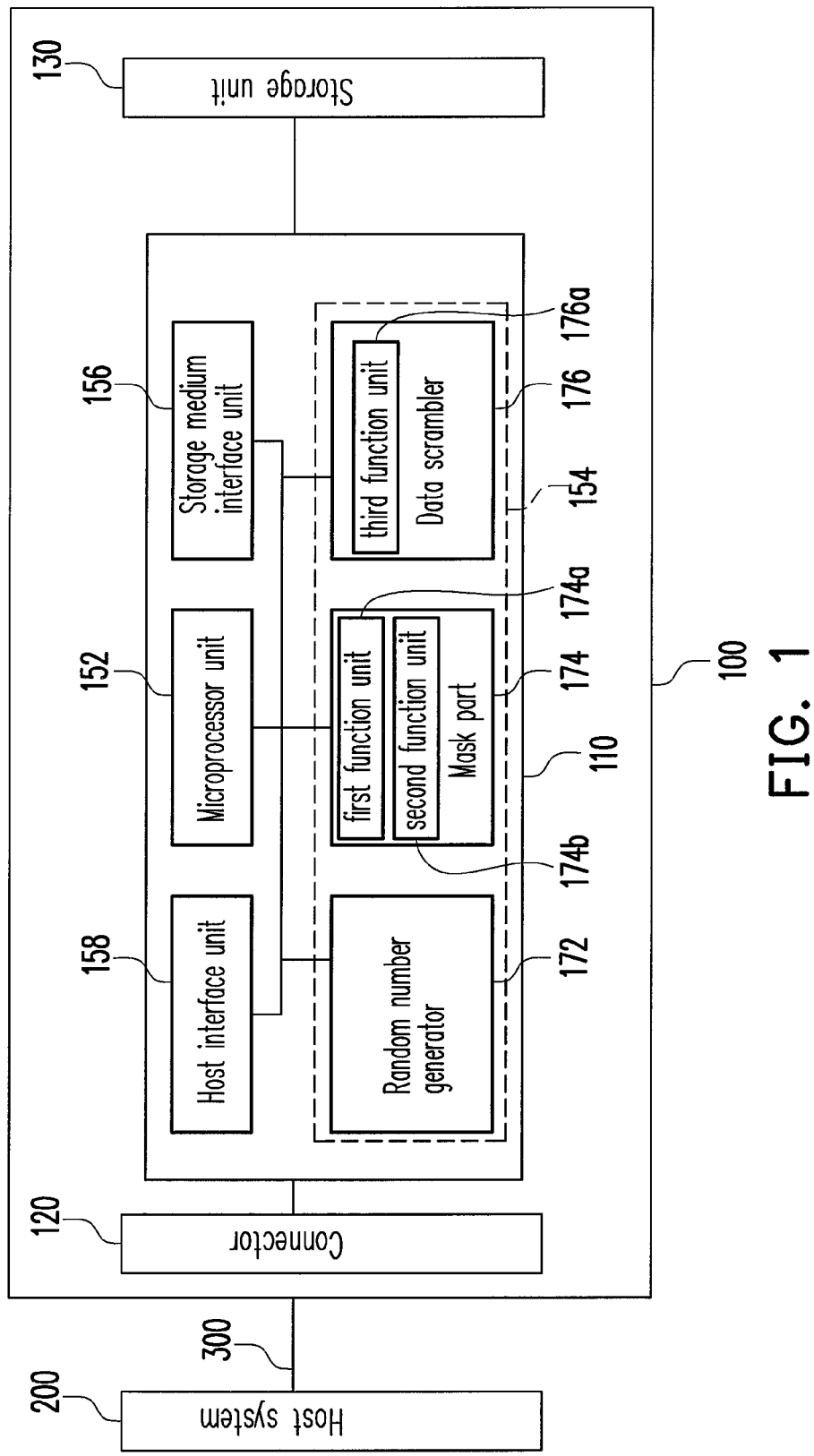
FIG. 1 is a schematic block diagram of a storage system according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

The present invention provides a storage system. When a host system is about to store data (i.e., raw data) into the storage system, the storage system executes a scrambling process on the raw data based on a instantly generated nonce value to generate a corresponding scrambled data and stores the scrambled data. When the host system is about to read data (i.e., raw data) from the storage system, the storage system executes a descrambling process on the corresponding scrambled data based on an instantly generated nonce value to restore the raw data. Because the nonce values used in the scrambling and descrambling processes are instantly generated when the processes are executed and are not stored in the storage system, the scrambling mechanism in the storage system is effectively prevented from being cracked by any unauthorized person, and accordingly the security of data stored in the storage system is ensured.

FIG. 1 is a schematic block diagram of a storage system according to an exemplary embodiment of the present invention.

Referring to FIG. 1, generally speaking, the storage system 100 works together with a host system 200 so that the host system 200 can write data into or read data from the storage system 100.

The storage system 100 includes a storage medium controller (may also be referred to as a controller) 110, a connector 120, and a storage unit 130.

The storage medium controller 110 executes a plurality of logic gates or control instructions implemented in a hardware or a firmware form and performs various data operations in the storage unit 130 according to instructions of the host system 200.

The storage medium controller 110 includes a microprocessor unit 152, a data encoding unit 154, a storage medium interface unit 156, and a host interface unit 158.

The microprocessor unit 152 cooperates with the data encoding unit 154, the storage medium interface unit 156, and the host interface unit 158 to carry out various operations of the storage system 100.

The data encoding unit 154 is coupled to the microprocessor unit 152, and executes a data scrambling mechanism according to the present exemplary embodiment. The data encoding unit 154 includes a random number generator 172, a mask part 174, and a data scrambler 176.

The random number generator 172 is coupled to the microprocessor unit 152, and which generates a random number according to an instruction of the microprocessor unit 152. For example, in the present exemplary embodiment, the random number generator 172 generates a random number having a length of 8 bytes. However, the present invention is not limited thereto, and the random number generator 172 may also generates a random number having a length of 3 bytes, 12 bytes, or any number of bytes according to a user's setting. In the present exemplary embodiment, the random number generated by the random number generator 172 is one of the parameters used for performing a scrambling process on data to be stored or a descrambling process on scrambled data. In particular, the microprocessor unit 152 stores the random number generated by the random number generator 172 so that subsequently a descrambling process can be performed on scrambled data. For example, the microprocessor unit 152 stores the random number generated by the random number generator 172 in the storage unit 130. In another exemplary embodiment of the present invention, a non-volatile memory may be configured in the storage medium controller 110 for storing the random number generated by the random number generator 172.

The mask part 174 is coupled to the microprocessor unit 152, and generates a padded value and a nonce value based on instructions of the microprocessor unit 152. The padded value and the nonce value generated by the mask part 174 are also parameters used for performing a scrambling process on data to be stored by the host system 200 or a descrambling process on scrambled data. It should be mentioned that the microprocessor unit 152 stores the random number for descrambling data, but in the present exemplary embodiment, the padded value and the nonce value generated by the mask part 174 are not stored. Namely, the padded value and the nonce value are generated every time when a scrambling process or a descrambling process is performed and are deleted right after they are used.

To be specific, a first function unit 174a is configured in the mask part 174, and the mask part 174 generates the padded value by using the first function unit based on a user password and the random number generated by the random number generator 172, wherein the user password is provided by the host system 200 and sent to the storage medium controller 110 by the host system 200. Besides, the first function unit 174a executes a predetermined function for encoding input data (i.e., the user password and the random number) and stuffing and extending the input data to a predetermined length to generate the padded value, wherein the predetermined length is determined according to a predetermined security level or a data processing length (i.e., the greater the predetermined length is, the higher the security level or the greater the data processing length is). In the present exemplary embodiment, the predetermined length is set to 24 bytes. However, the present invention is not limited thereto, and the predetermined length may be determined to any other value according to the user's requirement. In the present exemplary embodiment, the first function unit 174a is expressed as:

$$PV=F(PW,SHIFT,RN,PAD,PWL) \quad (1)$$

In foregoing expression (1), PV represents the padded value, SHIFT represents a shift value, PW represents the user password, RN represents the random number, PAD represents a stuffing bit, and PWL represents the length of the user password, wherein the shift value is to further scramble the padded value, and the stuffing bit is configured to extend the length of the padded value. In the present exemplary embodiment, the padded value, the shift value, the user password, the random number, the stuffing bit, and the length of the user password are all expressed in hexadecimal, wherein the user password has 8 bytes, the shift value has 1 byte, the random number has 8 bytes, and the user password has 4 byes. Thus, in the example of that the padded value is predetermined to have 24 bytes, the mask part 174 serves 0x00 of 3 (=24-8-1-8-4) bytes as the stuffing bit. Namely, in the present exemplary embodiment, the mask part 174 encodes the 8-byte user password, the 1-byte shift value, the 8-byte random number, the 3-byte stuffing bit, and the 4-byte user password length in sequence to generate the 24-byte padded value.

For example, assuming that the random number is "F69F2445DF4F9B17$_{16}$" and the user password is "6BC11B2061626364$_{16}$", the 24-byte padded value generated by the mask part 174 is "6BC11B2061626364-80-F69F2445DF4F9B17-000000-00000008$_{16}$".

It should be understood that foregoing expression (1) is only an implementation example of the first function unit 174a, and the present invention is not limited thereto. Instead, any function that can encode a random number and a user password to generate a padded value of a predetermined length can be served as the first function unit 174a.

For example, in another exemplary embodiment of the present invention, the first function unit 174a may also be implemented through following expression (2):

$$PV=F(PW,RN) \quad (2)$$

In foregoing expression (2), the first function unit 174a generates the padded value of a predetermined length by combining or repeating the user password and the random number according to a predetermined principle. For example, assuming that the random number is "F69F2445DF4F9B17$_{16}$" and the user password is "6BC11B2061626364$_{16}$", the 24-byte padded value generated by the mask part 174 may be "F69F2445DF4F9B17-6BC11B2061626364-F69F2445DF4F9B17$_{16}$" or "6BC11B2061626364-F69F2445DF4F9B17-6BC11B2061626364$_{16}$".

In addition, in yet another exemplary embodiment, the first function unit 174a may also be implemented through following expression (3):

$$PV=F(PW,RN,PAD) \quad (3)$$

In foregoing expression (3), the padded value is generated with only the user password, the random number, and the stuffing bit as parameters, and the length of the stuffing bit is determined according to the length of the padded value to be generated, the length of the random number, and the length of the user password. For example, assuming that the random number is "F69F2445DF4F9B17$_{16}$" and the user password is "6BC11B2061626364$_{16}$", because each of the random number and the user password has 8 bytes, the mask part 174 uses an 8-byte stuffing bit to generates the 24-byte padded value, such as "F69F2445DF4F9B17-0000000000000000-6BC11B2061626364$_{16}$" or "F69F2445DF4F9B17-6BC11B2061626364-0000000000000000$_{16}$".

In still another exemplary embodiment, the first function unit 174a may also be implemented through following expression (4):

$$PV=F(PW,RN,PAD,PWL) \quad (4)$$

In foregoing expression (4), the padded value is generated with the user password, the random number, the stuffing bit, and the length of the user password as parameters. For example, assuming that the random number is "F69F2445DF4F9B17$_{16}$", the user password is "6BC11B2061626364$_{16}$", and the length of the user password is "00000008$_{16}$", the 24-byte padded value generated by the mask part 174 may be "F69F2445DF4F9B17-6BC11B2061626364-00000000-00000008$_{16}$" or "F69F2445DF4F9B17-00000000-00000008-6BC11B2061626364$_{16}$".

It should be mentioned that besides the user password and the random number, the shift value or the length of the user password may also be used as the parameter for generating the padded value. In order to generate a padded value of the predetermined length, the length of the stuffing bit is adjusted according to the parameters used, wherein the length of the stuffing bit is not greater than the predetermined length minus the lengths of the user password and the random number, as expressed below:

$$PADLength \leq DeLength-(PWLength+RNLength) \quad (5)$$

In foregoing expression (5), PADLength represents the length of the stuffing bit, DeLength represents the predetermined length, PWLength represents the length of the user password, and RNLength represents the length of the random number.

In the present exemplary embodiment, a second function unit 174b is configured in the mask part 174, and the mask part 174 generates a nonce value by using the second function unit 174b based on a key and the padded value. The second function unit 174b may execute an encryption function conforming to the data encryption standard (DES), and the key may be a key used in the DES function. In other words, the mask part 174 inputs the padded value into the second function unit 174b, encrypts the padded value with the key, and serves a generated cipher text as the nonce value. Herein the mask part 174 uses the user password as the key. However, the present invention is not limited thereto, and in another exemplary embodiment of the present invention, a user of the host system 200 may input another predetermined user key different from the user password as the key, and the mask part 174 stores the user key input by the user for descrambling data. Besides, a predetermined value may also be set in the storage system 100 as the key when the storage system 100 is manufactured.

In another exemplary embodiment, the user key or the user password is served as a first key, the padded value received by the mask part 174 is served as a second key, and the mask part 174 encrypts the second key with the first key through the second function unit 174b and serves the generated cipher text as the nonce value.

Even though a DES encryption function is executed by the second function unit 174b in the present exemplary embodiment, the present invention is not limited thereto, and a DES decryption function may also be executed by the second function unit 174b. Namely, when a DES decryption function is executed by the second function unit 174b, the padded value is input into the second function unit 174b as a cipher text and decrypted into a plain text with the key to generate the nonce value.

It should be understood that the second function unit 174b is not limited to execute a DES function, and in another exemplary embodiment of the present invention, any symmetric function (for example, an advanced encryption standard (AES) encryption/decryption function), asymmetric function (for example, a Rivest-Shamir-Adleman (RSA) encryption function), or message digest (MD) function (for example, a MD5 function or a Secure Hash Standard (SHA) function) may be executed by the second function unit 174b in the present exemplary embodiment.

The data scrambler 176 is coupled to the microprocessor unit 152, and executes a scrambling process on raw data to generate scrambled data or executes a descrambling process on scrambled data according to instructions of the microprocessor unit 152. To be specific, a third function unit 176a is configured in the data scrambler 176, and the data scrambler 176 generates scrambled data by using the third function unit 176a based on the nonce value generated by the mask part 174 and raw data or restores the raw data by using the third function unit 176a according to the nonce value generated by the mask part 174 and the scrambled data. In the present exemplary embodiment, the third function unit 176a executes an XOR function. However, the present invention is not limited thereto, and the third function unit 176a may also execute other logical functions or a combination of multiple logical functions.

It should be mentioned that in the present exemplary embodiment, the length of the nonce value generated by the mask part 174 through the second function unit 174b (i.e., a DES encryption function processing) is the same as the length of the padded value generated through the first function unit 174a. Thus, when the data scrambler 176 scrambles the raw data by using the third function unit 176a (i.e., a XOR function processing), the length of the raw data should be equal to the length of the nonce value. For example, in the present exemplary embodiment, the mask part 174 generates a padded value of 24 bytes by using the first function unit 174a based on the random number, the user password, and the length of the user password and generates a nonce value of 24 bytes by using the second function unit 174b based on the padded value and the key. Thus, if the raw data also has 24 bytes, the data scrambler 176 can generate a 24-byte scrambled data by using the third function unit 176a directly based on the nonce value. Namely, in the present exemplary embodiment, the length of the padded value and the length of the nonce value are the same as the length of the raw data. However, the present invention is not limited thereto, and when the length of the nonce value is different from the length of the raw data, the storage system may extend the nonce value by stuffing data bytes therein or repeating the nonce value, so as to make the length of the extended nonce value to be the same as the length of the raw data, or the storage system may divide the raw data into a plurality of sub raw data, so as to make the length of the sub raw data to be the same as the length of the nonce value.

In the present exemplary embodiment, the random number generator 172, the mask part 174, and the data scrambler 176 are implemented in a hardware form. However, the present invention is not limited thereto, and in another exemplary embodiment of the present invention, the random number generator 172, the mask part 174, and the data scrambler 176 may also be implemented in the storage medium controller 110 as a firmware form. For example, the random number generator 172, the mask part 174, and the data scrambler 176 including a plurality of program instructions are burned in a program memory (for example, a read only memory (ROM)), and the program memory is embedded in the storage medium controller 110. When the storage system 100 is in operation, the program instructions of the random number generator 172, the mask part 174, and the data scrambler 176 are executed by the microprocessor unit 152 to accomplish the data scrambling mechanism according to embodiments of the present invention.

Additionally, in another embodiment of the present invention, the program instructions of the random number generator 172, the mask part 174, and the data scrambler 176 may also be stored in the storage unit 130 as program codes. Similarly, the program instructions of the random number generator 172, the mask part 174, and the data scrambler 176 are executed by the microprocessor unit 152 when the storage system 100 is in operation.

The storage medium interface unit 156 is coupled to the microprocessor unit 152 and configured to access the storage unit 130. Namely, data to be written into the storage unit 130 is converted by the storage medium interface unit 156 into a format acceptable to the storage unit 130.

The host interface unit 158 is coupled to the microprocessor unit 152 and configured to receive and identify instructions and data from the host system 200. Namely, instructions and data received from the host system 200 are transferred to the microprocessor unit 152 through the host interface unit 158. In the present exemplary embodiment, the host interface unit 158 is a secure digital (SD) interface. However, the present invention is not limited thereto, and the host interface unit 158 may also be a serial advanced technology attachment (SATA) interface, a universal serial bus (USB) interface, an Institute of Electrical and Electronic Engineers (IEEE) 1394 interface, a peripheral component interconnect (PCI) express interface, a memory stick (MS) interface, a multi media card (MMC) interface, a compact flash (CF) interface, an integrated device electronics (IDE) interface, or other suitable data transmission interfaces.

In addition, even though not shown in the present exemplary embodiment, the storage medium controller 110 may further include other circuits for controlling the storage unit 130, such as an error correcting unit and a power management unit.

The connector 120 is coupled to the storage medium controller 110 and used to be connected to the host system 200 through a bus 300. In the present exemplary embodiment, the connector 120 is a SD connector. However, the present invention is not limited thereto, and the connector 120 may also be a SATA connector, a USB connector, an IEEE 1394 connector, a PCI express connector, a MS connector, a MMC connector, a CF connector, an IDE connector, or other suitable connectors.

The storage unit 130 is coupled to the storage medium controller 110 and configured to store data. In the present exemplary embodiment, the storage unit 130 has a hidden area for storing the random number generated by the random number generator 172, wherein the hidden area refers to an area that can only be accessed by the storage medium controller 110 but not the host system 200. In the present exemplary embodiment, the storage unit 130 is a one time program (OTP) memory. However, it should be understood that the storage unit 130 may also be a non-volatile memory (for example, a flash memory), a magnetic disk, or any other suitable storage medium.

Figure 2:
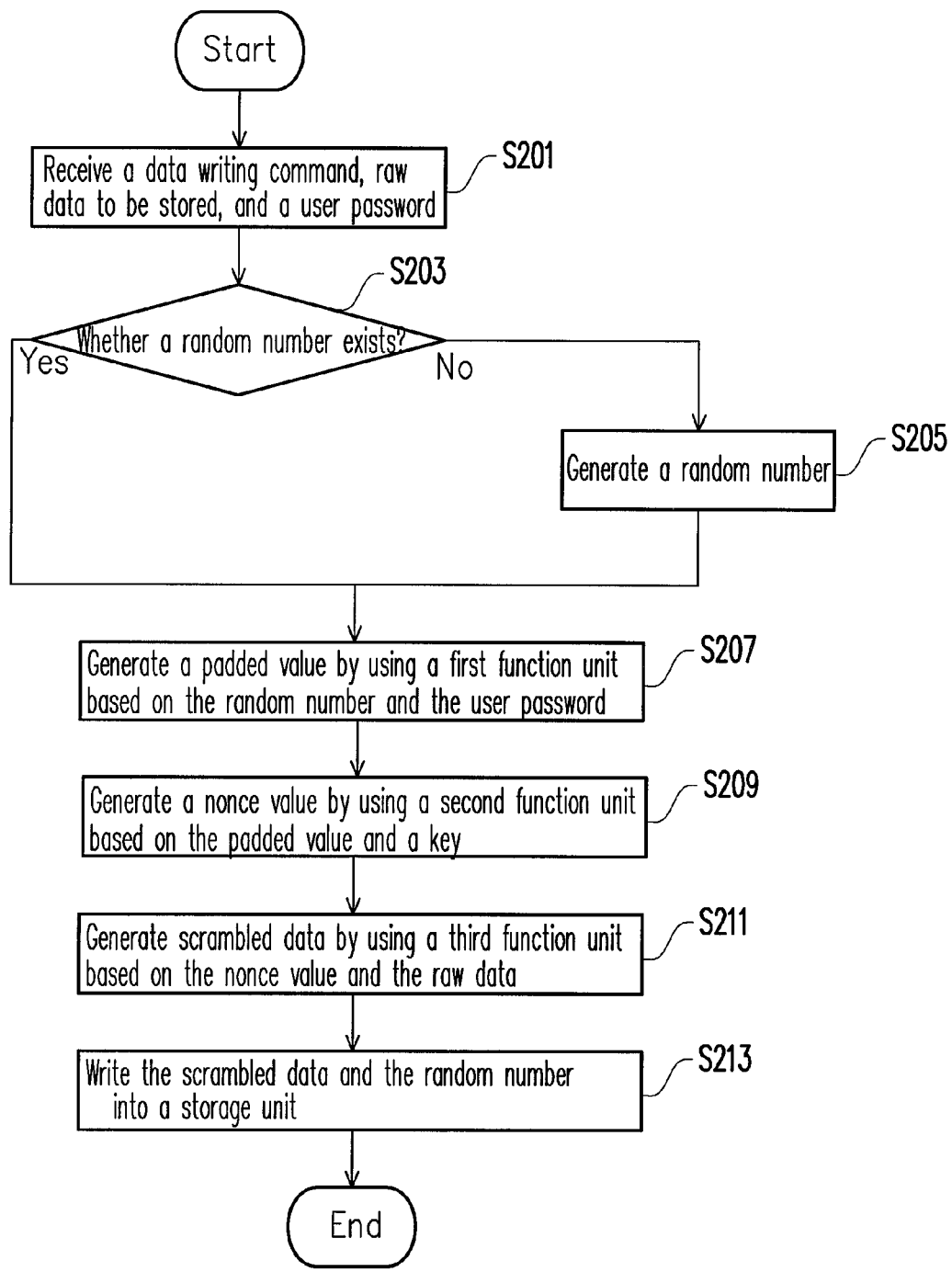
FIG. 2 is a flowchart of a data scrambling method according to an exemplary embodiment of the present invention.
Figure 3:
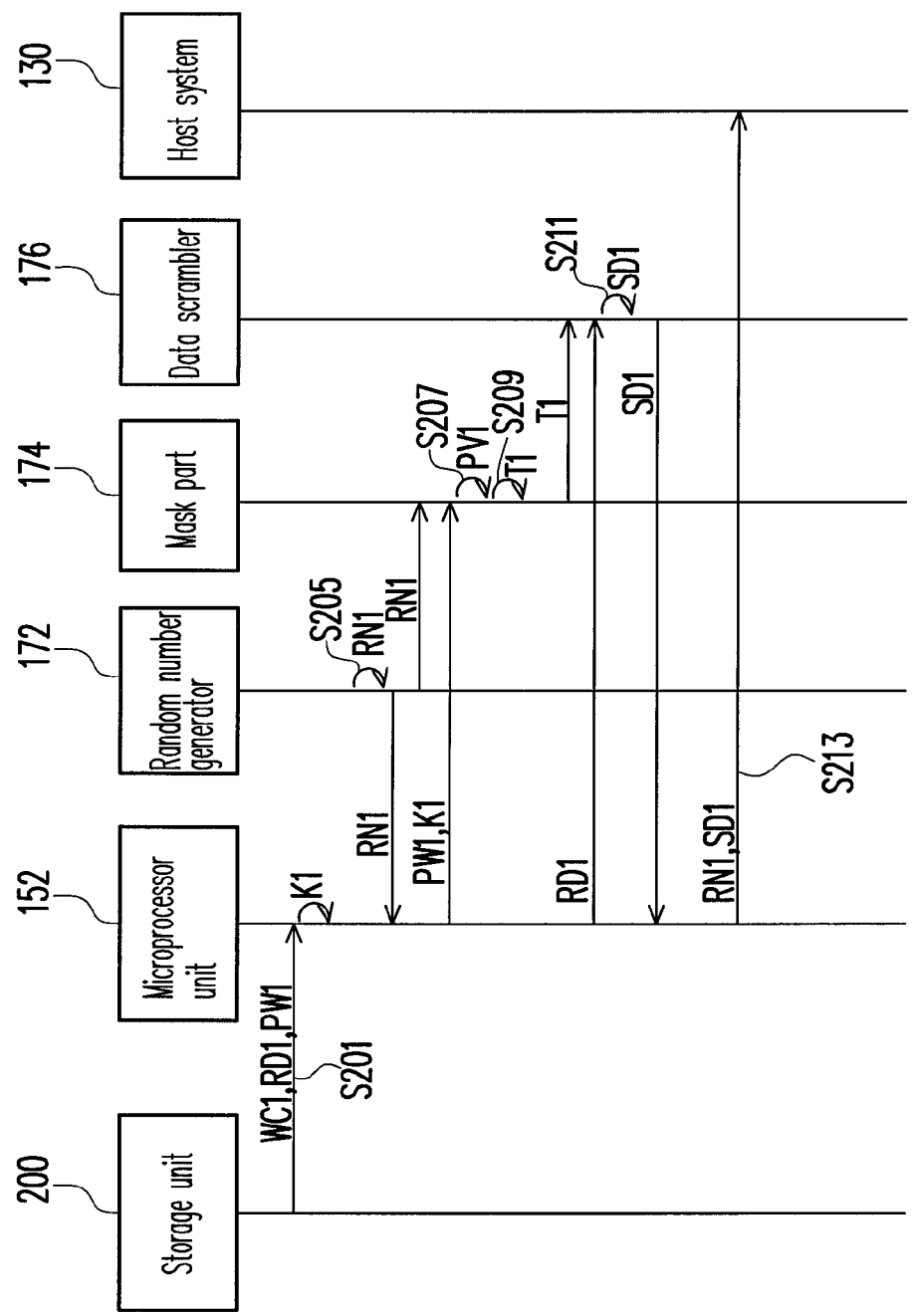
FIG. 3 illustrates the data stream when a data scrambling method is executed according to an exemplary embodiment of the present invention.

FIG. 2 is a flowchart of a data scrambling method according to an exemplary embodiment of the present invention, and FIG. 3 illustrates the data stream when the data scrambling method is executed according to an exemplary embodiment of the present invention.

Referring to both FIG. 2 and FIG. 3, when the host system 200 is about to store data into the storage system 100, in step S201, the microprocessor unit 152 of the storage medium controller 110 receives a data writing command WC1, raw data RD1 to be stored, and a user password PW1 from the host system 200 through the host interface unit 158. To be specific, the storage system 100 can protect the data stored by a user according to a password set by the user. Thus, when the user is about to store data into the storage system 100, the user needs to provide a predetermined user password. For example, in an exemplary embodiment of the present invention, the user uses the storage system through a software interface, wherein the software interface provides a password box such that the user can input the user password.

In step S203, the microprocessor unit 152 determines whether a random number exists in the storage unit 130. If the storage unit 130 does not store any random number, in step S205, the random number generator 172 generates a random number under the control of the microprocessor unit 152. For example, in the example illustrated in FIG. 3, the random number generator 172 generates a random number RN1 since the storage unit 130 does not store any random number.

After that, in step S207, the mask part 174 generates a padded value PV1 by using the first function unit 174a based on the random number RN1 and the user password PW1, and in step S209, the mask part 174 generates a nonce value T1 by using the second function unit 174b based on the padded value PV1 and a key K1. As described above, in the present example, the mask part 174 uses the user password PW1 as the key K1. However, if the user uses a user key as the key, aforementioned software interface further provides a key box for the user to set the user key.

Next, in step S211, the data scrambler 176 generates scrambled data SD1 through the third function unit 176a based on the nonce value T1 and the raw data RD1. Finally, in step S213, the microprocessor unit 152 writes the scrambled data SD1 and the random number RN1 into the storage unit 130 through the storage medium interface unit 156.

As described above, because the storage medium controller 110 writes the scrambled data instead of the raw data into the storage unit 130, the storage medium controller 110 has to perform a descrambling process to restore the scrambled data into the raw data when the host system 200 is about to read the data.

Figure 4:
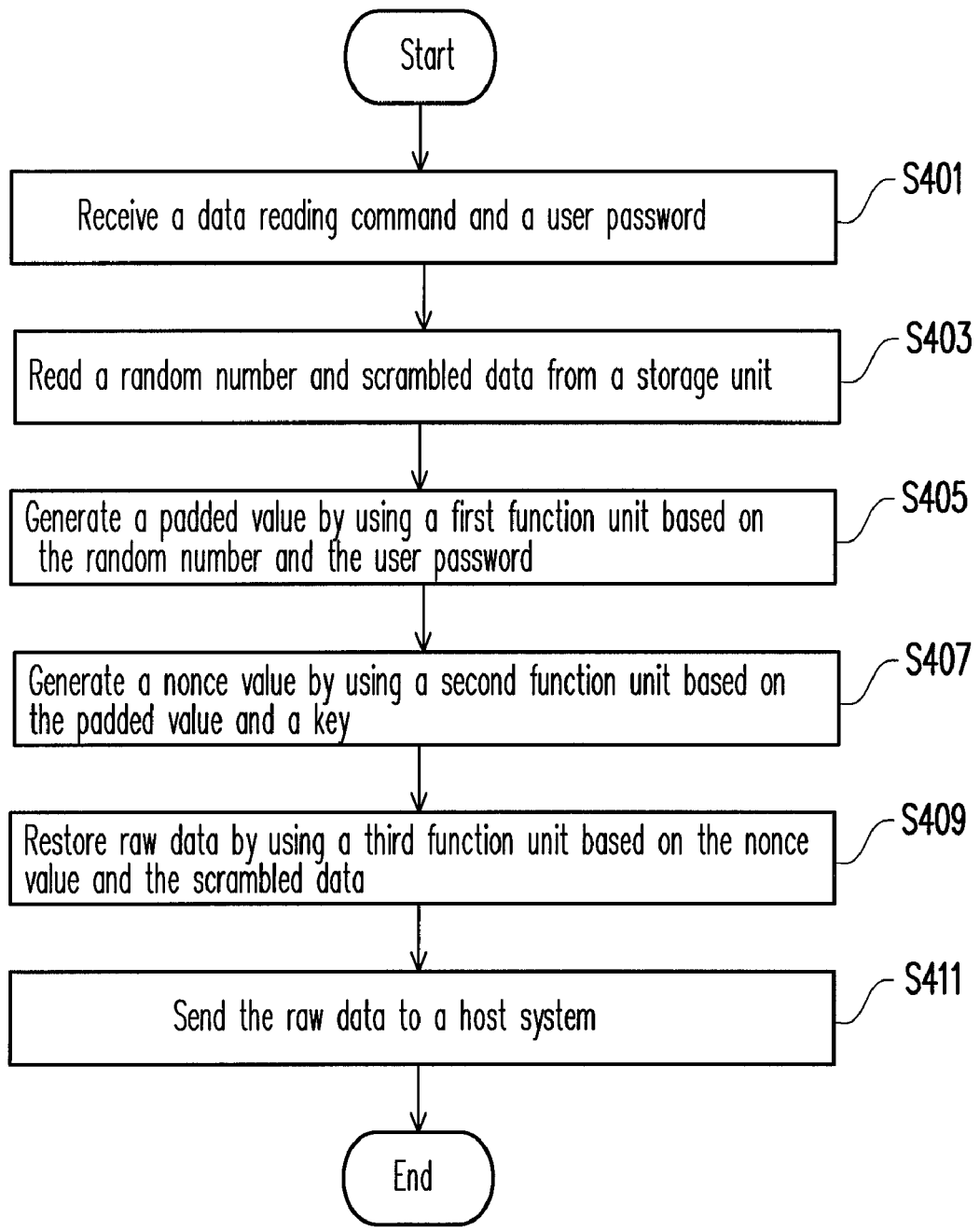
FIG. 4 is a flowchart of a data descrambling method according to an exemplary embodiment of the present invention.
Figure 5:
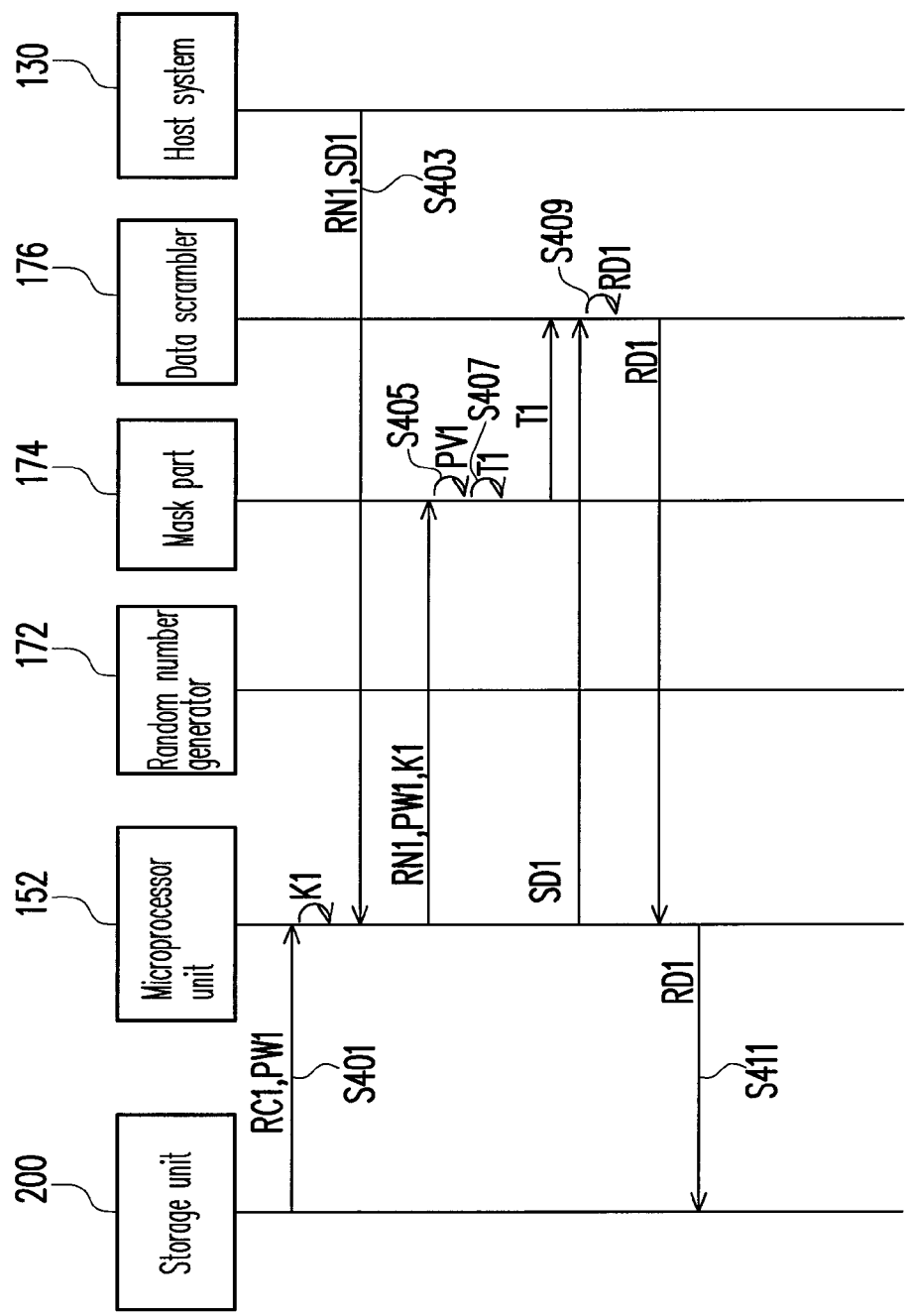
FIG. 5 illustrates the data stream when a data descrambling method is executed according to an exemplary embodiment of the present invention.

FIG. 4 is a flowchart of a data descrambling method according to an exemplary embodiment of the present invention, and FIG. 5 illustrates the data stream when the data descrambling method is executed according to an exemplary embodiment of the present invention.

Referring to both FIG. 4 and FIG. 5, when the host system 200 is about to read the raw data RD1 from the storage system 100, in step S401, the microprocessor unit 152 of the storage medium controller 110 receives a data reading command RC1 and the user password PW1 from the host system 200 through the host interface unit 158.

In step S403, the microprocessor unit 152 reads the random number RN1 and the scrambled data SD1 from the storage unit 130 through the storage medium interface unit 156.

After that, in step S405, the mask part 174 generates the padded value PV1 by using the first function unit 174a based on the random number RN1 and the user password PW1, and in step S407, the mask part 174 generates the nonce value T1 by using the second function unit 174b based on the padded value PV1 and the key K1. As described above, in the present example, the mask part 174 uses the user password PW1 as the key K1.

Next, in step S409, the data scrambler 176 restores the raw data RD1 by using the third function unit 176a based on the nonce value T1 and the scrambled data SD1. In step S411, the microprocessor unit 152 transfers the restored raw data RD1 to the host system 200 through the host interface unit 158. It should be mentioned that in the present exemplary embodiment, the host system 200 has to provide a correct user password to correctly descramble the scrambled data. Otherwise, the host system 200 will not receive the correct data. Namely, the data obtained by the storage medium controller 110 by executing the descrambling process according to a wrong user password is not the raw data stored by the host system 200.

It should be mentioned that in the present exemplary embodiment of the present invention, if the storage unit 130 stores multiple scrambled data corresponding to multiple raw data at the same time, the scrambling process has to be executed on these scrambled data based on the same random number. Namely, the storage medium controller 110 only erases the random number stored in the storage unit 130 after all the scrambled data stored in the storage unit 130 is restored into raw data and will generate a new random number when next time data is written. However, the present invention is not limited thereto, and if the storage unit 130 provides enough space for storing multiple random numbers, the storage medium controller 110 may also generate a random number corresponding to each raw data to be used in the scrambling process.

As described above, in exemplary embodiments of the present invention, data is scrambled by using an instantly generated nonce value, and because the nonce value is not stored in a storage system, cracking the scrambled data is made more difficult. In addition, because the nonce value is generated through the same method (for example, through an encryption function or a decryption function) in a scrambling process or a descrambling process, it is not necessary to dispose a circuit for executing an inverse operation, and accordingly the volume of the entire storage system is greatly reduced. Moreover, a storage system only generates a new random number and a different nonce value after all the scrambled data stored in the storage system is restored, so that the security of the data protected by using the nonce value is further ensured. The previously described exemplary embodiments of the present invention have many advantages, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data scrambling method, for scrambling raw data from a host system, the data scrambling method comprising:
   generating a random number, and storing the random number into a storage device by a controller having a microprocessor;
   receiving a user password from the host system by the controller;
   generating a padded value through a first function unit based on the random number and the user password by the controller;
   generating a nonce value through a second function unit based on the padded value and a key by the controller; and
   generating scrambled data corresponding to the raw data by using a third function unit based on the nonce value and the raw data by the controller.

2. The data scrambling method according to claim 1, wherein the step of generating the padded value through the first function unit based on the random number and the user password by the controller comprises:
   encodeing the random number and the user password through the first function unit to generate the padded value.

3. The data scrambling method according to claim 2 further comprising generating the padded value by using at least one of the length of the user password, a stuffing bit, and a shift value, wherein the length of the padded value is equal to a predetermined length.

4. The data scrambling method according to claim 3, wherein the predetermined length is equal to the length of the raw data.

5. The data scrambling method according to claim 3, wherein $$PADLength \leq DeLength-(PWLength+RNLength),$$

wherein PADLength represents the length of the stuffing bit, DeLength represents the predetermined length, PWLength represents the length of the user password, and RNLength represents the length of the random number.

6. The data scrambling method according to claim 1, wherein the second function unit executes a symmetric function, an asymmetric function, or a message digest function.

7. The data scrambling method according to claim 1, wherein the third function unit executes a logical function.

8. The data scrambling method according to claim 1 further comprising serving the user password as the key.

9. The data scrambling method according to claim 1 further comprising randomly generating the key and storing the key into the storage device.

10. The data scrambling method according to claim 6, wherein the symmetric function is an advanced encryption standard (AES) function or a data encryption standard (DES) function.

11. The data scrambling method according to claim 6, wherein the asymmetric function is a Rivest-Shamir-Adleman (RSA) encryption function.

12. The data scrambling method according to claim 6, wherein the message digest function is a MD5 function or a SHA function.

13. The data scrambling method according to claim 7, wherein the logical function is a XOR function.

14. The data scrambling method according to claim 1 further comprising:
   extending the nonce value, wherein the length of the extended nonce value is equal to the length of the raw data.

15. The data scrambling method according to claim 1 further comprising:
   dividing the raw data into a plurality of sub raw data, wherein the length of at least one of the sub raw data is equal to the length of the nonce value.

16. A controller, for scrambling raw data from a host system, the controller comprising:
   a microprocessor unit;
   a storage medium interface unit, coupled to the microprocessor unit, and configured to connect to a storage unit;
   a host interface unit, coupled to the microprocessor unit, and configured to connect to the host system; and
   a data encoding unit, coupled to the microprocessor unit, and configured to generate a padded value by using a first function unit based on a random number and a user password from the host system, generating a nonce value by using a second function unit based on the padded value and a key, and generating scrambled data corresponding to the raw data by using a third function unit based on the nonce value and the raw data,
   wherein the microprocessor unit stores the random number in the storage unit.

17. The controller according to claim 16, wherein the data encoding unit comprises:
   a random number generator, configured to generate the random number;
   an mask part, configured to set the key, generating the padded value by using the first function unit, and generating the nonce value by using the second function unit; and
   a data scrambler, configured to generate the scrambled data corresponding to the raw data by using the third function unit.

18. The controller according to claim 16, wherein the data encoding unit encodes the random number and the user password through the first function unit to generate the padded value.

19. The controller according to claim 18, wherein the data encoding unit further generates the padded value by using at least one of the length of the user password, a stuffing bit, and a shift value, wherein the length of the padded value is equal to a predetermined length.

20. The controller according to claim 19, wherein the predetermined length is equal to the length of the raw data.

21. The controller according to claim 19, wherein $$PADLength \leq DeLength-PWLength+RNLength),$$

wherein PADLength represents the length of the stuffing bit, DeLength represents the predetermined length, PWLength represents the length of the user password, and RNLength represents the length of the random number.

22. A storage system, comprising:
   a connector, configured to couple to a host system and receive raw data and a user password from the host system;
   a storage device; and
   a controller, having a microprocessor and coupled to the connector and the storage device, wherein the controller is configured to generate a random number, generate a padded value by using a first function unit based on the random number and the user password, generate a nonce value by using a second function unit based on the padded value and a key, generate scrambled data corresponding to the raw data by using a third function unit based on the nonce value and the raw data, and writing the scrambled data into the storage device, wherein the controller stores the random number in the storage device.

23. The storage system according to claim 22, wherein the controller encodes the random number and the user password through the first function unit to generate the padded value.

24. The storage system according to claim 23, wherein the controller further generates the padded value by using at least one of the length of the user password, a stuffing bit, and a shift value, wherein the length of the padded value is equal to a predetermined length.

25. A data descrambling method, for descrambling scrambled data stored in a storage device according to a user password from a host system, the data descrambling method comprising:
  reading a random number from the storage unit by a controller having a microprocessor;
  generating a padded value through a first function unit based on the random number and the user password by the controller;
  generating a nonce value through a second function unit based on the padded value and a key by the controller; and
  generating raw data corresponding to the scrambled data through a third function unit based on the nonce value and the scrambled data by the controller.

26. The data descrambling method according to claim 25, wherein the step of generating the padded value through the first function unit based on the random number and the user password by the controller comprises:
  encodeing the random number and the user password through the first function unit to generate the padded value.

27. The data descrambling method according to claim 26 further comprising generating the padded value by using at least one of the length of the user password, a stuffing bit, and a shift value, wherein the length of the padded value is equal to a predetermined length.

28. A data processing method, comprising:
  respectively receiving a first key and a second key by a controller having a microprocessor;
  encrypting the second key by using the first key to generate a nonce value by the controller;
  receiving raw data from a host system by the controller; and
  generating scrambled data corresponding to the raw data by using a third function unit based on the nonce value and the raw data by the controller.

29. The data processing method according to claim 28, wherein the second key is generated by the first key.

30. The data processing method according to claim 28, wherein the length of the second key is equal to the length of the raw data.

31. The data processing method according to claim 28 further comprising:
  restoring the raw data through the third function unit based on the nonce value and the scrambled data by the controller.

32. The data processing method according to claim 28, wherein the third function unit is a logical function.

33. The data processing method according to claim 28 further comprising:
  extending the nonce value, wherein the length of the extended nonce value is equal to the length of the raw data.

34. The data processing method according to claim 28 further comprising:
  dividing the raw data into a plurality of sub raw data, wherein the length of at least one of the sub raw data is equal to the length of the nonce value.

* * * * *